(12) United States Patent
Shepard et al.

(10) Patent No.: US 10,070,055 B2
(45) Date of Patent: Sep. 4, 2018

(54) DEVICES AND METHODS FOR OPTICALLY MULTIPLEXED IMAGING

(71) Applicant: MASSACHUSETTS INSTITUTE OF TECHNOLOGY, Cambridge, MA (US)

(72) Inventors: Ralph Hamilton Shepard, Somerville, MA (US); Yaron Rachlin, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 303 days.

(21) Appl. No.: 14/668,214

(22) Filed: Mar. 25, 2015

(65) Prior Publication Data
US 2017/0026570 A1 Jan. 26, 2017

(51) Int. Cl.
*H04N 5/775* (2006.01)
*H04N 5/232* (2006.01)
(Continued)

(52) U.S. Cl.
CPC ............ *H04N 5/23238* (2013.01); *G01J 3/12* (2013.01); *G01J 3/28* (2013.01); *G02B 13/10* (2013.01);
(Continued)

(58) Field of Classification Search
None
See application file for complete search history.

(56) References Cited

U.S. PATENT DOCUMENTS

| 4,509,081 A | 4/1985 | Peyton et al. |
| 4,918,929 A | 4/1990 | Chudy et al. |

(Continued)

FOREIGN PATENT DOCUMENTS

| CN | 2216687 Y | 1/1996 |
| EP | 2 157 794 A2 | 2/2010 |

(Continued)

OTHER PUBLICATIONS

International Search Report and Written Opinion for Application No. PCT/US2016/033775, dated Oct. 14, 2016 (25 pages).

(Continued)

*Primary Examiner* — Eileen M Adams
(74) *Attorney, Agent, or Firm* — Nutter McClennen & Fish LLP

(57) ABSTRACT

Devices and methods for multiplexed imaging are provided. In one embodiment, an imaging device can simultaneously direct light of a same spectrum from each of a plurality of image channels onto an image sensor to create a multiplexed image on the sensor. Each image channel can collect light from different portions of an extended field of view or from the same portion with different perspectives. The device can also include one or more encoders to encode light from the channels prior to detection. The devices and methods described herein can also include disambiguating a captured multiplexed image to create images for each of the plurality of image channels. Disambiguated images can cover the extended field of view at a high spatial resolution despite using only a single small format image sensor, or can produce stereo or 3D images having the full resolution of the sensor.

30 Claims, 12 Drawing Sheets

(51) Int. Cl.
  G01J 3/12   (2006.01)
  G01J 3/28   (2006.01)
  G02B 13/10  (2006.01)
  G02B 27/10  (2006.01)
  G02B 27/12  (2006.01)
  G02B 27/14  (2006.01)
  G03B 35/10  (2006.01)
  H04N 13/02  (2006.01)
  H04N 13/00  (2018.01)
  G03B 37/00  (2006.01)

(52) U.S. Cl.
  CPC ..... *G02B 27/1013* (2013.01); *G02B 27/1066* (2013.01); *G02B 27/126* (2013.01); *G02B 27/143* (2013.01); *G03B 35/10* (2013.01); *G03B 37/00* (2013.01); *H04N 13/0048* (2013.01); *H04N 13/021* (2013.01); *H04N 13/0214* (2013.01)

(56) References Cited

U.S. PATENT DOCUMENTS

| | | | |
|---|---|---|---|
| 5,485,306 | A | 1/1996 | Kiunke et al. |
| 6,008,920 | A | 12/1999 | Hendrix |
| 6,411,327 | B1 | 6/2002 | Kweon et al. |
| 7,038,863 | B2 | 5/2006 | Chen et al. |
| 7,620,309 | B2 | 11/2009 | Georgiev |
| 2007/0002467 | A1 | 1/2007 | Claytor |
| 2007/0081236 | A1 | 4/2007 | Tearney et al. |
| 2012/0257167 | A1* | 10/2012 | Gille ............ A61B 3/117 351/219 |
| 2013/0194481 | A1 | 8/2013 | Golub et al. |
| 2013/0314509 | A1* | 11/2013 | Laine ............ H04N 13/0217 348/49 |
| 2014/0104104 | A1* | 4/2014 | Gordon ............ H01Q 3/267 342/359 |
| 2014/0192166 | A1 | 7/2014 | Cogswell et al. |
| 2015/0029572 | A1 | 1/2015 | Vail et al. |
| 2015/0036015 | A1 | 2/2015 | Lelescu et al. |
| 2015/0069239 | A1* | 3/2015 | Kester ............ G01J 3/36 250/332 |
| 2015/0077764 | A1 | 3/2015 | Braker et al. |
| 2016/0123810 | A1 | 5/2016 | Ando et al. |
| 2017/0214861 | A1 | 7/2017 | Rachlin et al. |

FOREIGN PATENT DOCUMENTS

| | | |
|---|---|---|
| EP | 2 779 654 A2 | 9/2014 |
| WO | 2014/004882 A2 | 1/2014 |

OTHER PUBLICATIONS

Shepard, R., et al., "Design architectures for optically multiplexed imaging," Optics Express, 2015, v. 23, pp. 31419-31435; [online] [retrieved Sep. 12, 2016] <URL: https://www.osapublishing.org/oe/abstract.cfm?uri=oe-23-24-31419>.

Chen, C.V., et al., Optics system design applying a micro-prism array of a single lens stereo image pair. Opt Express. Sep. 29, 2008;16(20):15495-505.

Finlan, J.M., et al., Nonmechanical beam steering using spatial multiplexing. Proc. SPIE 3131, Optical Scanning Systems: Design and Applications, 156 (Jul. 7, 1997), 9 pages.

Goshtasby, A., et al., Design of a single-lens stereo camera system. Pattern Recognition, vol. 26, Issue 6, Jun. 1993, 923-937.

Gupta, R., et al., Compressive sensing with local geometric features. Int J Comput Geom Appl, 22, 365 (2012), 23 pages.

Horisaki, R., et al., Multi-channel data acquisition using multiplexed imaging with spatial encoding. Opt Express. Oct. 25, 2010;18(22):23041-53. doi: 10.1364/OE.18.023041.

Krogmann, D., et al., Infrared micro-optics technologies. Proc. SPIE 5406, Infrared Technology and Applications XXX, pp. 121-132 (Aug. 30, 2004).

Lee, D.H., A novel stereo camera system by a biprism. IEEE Transactions on Robotics and Automation, vol. 16, Issue 5, Oct. 2000, pp. 528-541.

Lovegrove, W., Single-camera stereo vision for obstacle detection in mobile robots. SPIE, Nov. 6, 2007, 2 pages.

Mahalanobis, A., et al., Off-axis sparse aperture imaging using phase optimization techniques for application in wide-area imaging systems. Appl Opt. Oct. 1, 2009;48(28):5212-24. doi: 10.1364/AO.48.005212.

Marcia, R.F., et al., Superimposed video disambiguation for increased field of view. Opt Express. Oct. 13, 2008;16 (21):16352-63.

Mathieu, H., [Système de miroirs pour la stéréoscopie]. [Rapport Technique] RT-0172, INRIA, Jun. 1995, 17 pages. French language article. English abstract only (p. 4).

Niishimoto, Y., et al., A feature-based stereo model using small disparities. Proceedings of IEEE International Workshop on Industrial Applications of Machine Vision and Machine Intelligence, Seiken Symposium, pp. 192-196, Tokyo Feb. 2-5, 1987.

Sedazzari, C., Optics & Lenses: Smart optics and lenses image multiple views. Vision Systems Design 14.12 (Dec. 1, 2009): 4 pages.

Stenner, M.D., et al., Wide-field feature-specific imaging. Frontiers in Optics 2007, San Jose, CA, Sep. 16, 2007, OSA Technical Digest, Optical Society of America, 2007, 1 page.

Teoh, W., et al., an inexpensive stereoscopic vision system for robots. Proceedings of the 1984 IEEE International Conference on Robotics and Automation, Mar. 1984, vol. 1, pp. 186-189.

Tholl, H.D., et al., New infared seeker technology. Proc. SPIE 3436, Infrared Technology and Applications XXIV, pp. 484-493 (Oct. 26, 1998).

Treeaporn, V., et al., Increased field of view through optical multiplexing. Opt Express. Oct. 11, 2010;18 (21):22432-45. doi: 10.1364/OE.18.022432.

Uttam, S., et al., Optically multiplexed imaging with superposition space tracking. Opt Express. Feb. 2, 2009;17 (3):1691-713.

International Search Report and Written Opinion for Application No. PCT/US2016/024075, dated Jun. 10, 2016 (12 pages).

\* cited by examiner

DEVICES AND METHODS FOR OPTICALLY MULTIPLEXED IMAGING

GOVERNMENT RIGHTS

This invention was made with government support under Air Force contract FA8721-05-C-0002. The government has certain rights in the invention.

FIELD

This invention relates generally to imaging and, more particularly, to optically multiplexed imaging of a field of view.

BACKGROUND

Many different fields of endeavor have a need to image extended fields of view with high resolution to detect and observe objects within the field of view or track movement relative to reference points. For example, observational astronomy, celestial navigation systems, and security/surveillance applications all need to monitor extended fields of view with high resolution. Image sensors are limited by a tradeoff between field of view and resolution: with a finite number of pixels on the sensor the sampling resolution in object space (i.e., the number of pixels devoted to a given area in the field of view being imaged) is decreased as the field of view is increased. When requirements demand a combination of extended field of view and resolution that exceeds a conventional single-camera fixed field of view architecture, these needs are often met using arrays of multiple cameras or image sensors arranged to view different regions of a scene, or using a single sensor or pixel array with a scanning mechanism (e.g., a pan-tilt-zoom mechanism) to sweep out a high-resolution image of an extended field of view over time. The former is bulky and costly because it requires discrete optical and sensor assemblies for each region of the field of view. The latter suffers from the need for a scanning mechanism and intermittent temporal sampling (i.e., the device cannot view the entire field of view at any one time). Other designs incorporate both a bank of cameras and scanning mechanisms to improve upon some aspects of dedicated array or scanning devices, but these hybrid devices also suffer the disadvantages of both.

Other fields endeavor to create a stereo image or a 3-dimensional (3D) depth image of a scene. This can be done using two or more cameras that observe an object from different perspectives, or with a single camera that produces images from two or more perspectives on a single focal plane. The former method suffers from the added cost, power, volume, and complexity of using multiple cameras, as well as geometric and intensity differences in the images resulting from the different optical systems. Methods using a single camera approach typically either (a) use prisms or mirrors to produce two or more shifted images on a camera's focal plane where each image fills only a fraction of the focal plane's area to prevent overlap, thereby resulting in a reconstructed stereo image that has a smaller field of view and fewer pixels than are available in the image sensor, or (b) use a moving element that allows a sequence of frames to be captured from different perspectives. This latter approach is more complex and restricts the sampling rate of the system.

Optically multiplexed imaging is a developing field in the area of computational imaging. Images from different regions of a scene, or from different perspectives of the same region, are overlaid on a single sensor to form a multiplexed image in which each pixel on the focal plane simultaneously views multiple object points, or the same object point from multiple perspectives. A combination of hardware and software processes are then used to disambiguate the measured pixel intensities and produce a de-multiplexed image. For a system with N multiplexed channels, the resulting image has N-times greater pixels than the format of the image sensor used to capture the multiplexed image. This technique allows a multiplexed imaging device to increase its effective resolution (i.e. the number of pixels in the reconstructed image), which can then be applied to extending the field of view or capturing images from multiple perspectives without resolution loss.

Prior designs of multiplexing imaging devices have their own drawbacks, however. For example, early conceptual designs utilized a multiple lens imager optical system where each lens focuses on the same image sensor. This configuration is likely to suffer defocus from tilted image planes and keystone distortion, however, in addition to its questionable savings in cost over a more traditional array of imaging sensors. Further, systems that utilize full-aperture beam splitters to combine various fields of view require large multiplexing optics and suffer loss due to escaping light from imperfect beam splitting. Still further, some prior designs utilize prisms to divide a field of view, but these systems are limited in their ability to image wide fields of view due to the fact that prisms can only be steered through small angles because of optical dispersion. In addition, many prior multiplexing designs utilize a form of scanning wherein each narrower field of view is sequentially captured by an imaging sensor, meaning the various fields of view are not simultaneously multiplexed onto the imaging sensor (e.g., similar to the moving element stereo imaging devices described above).

Multiplexing is also utilized in certain stereo imaging devices, but it is based on spectral multiplexing, which is a type of optically multiplexed imaging in which two or more images containing different spectrums of light are multiplexed into an optical device and the superimposed image is separated using color filters at the focal plane of the camera. Devices utilizing this approach suffer from the disadvantage of excluding portions of the spectral waveband, as well as loss of pixel resolution due to the color filter mosaic at the image plane.

Accordingly, there is a need in the art for improved devices and methods for optically multiplexed imaging. In particular, there is a need for improved devices and methods that provide for imaging an extended field of view without the disadvantages associated with assembling a large format array of imaging sensors, employing a slow moving scanning mechanism, or multiplexing in a manner that sacrifices resolution or other information capture (e.g., loss of spectral waveband portions, etc.).

SUMMARY

The present disclosure generally provides devices and methods for increasing any of (a) field of view, (b) pixel resolution, and (c) parallax between objects viewed in a plurality of multiplexed channels by multiplexing either multiple different portions of an extended field of view onto a single imaging sensor or by multiplexing images of the same field of view taken from different perspectives onto a single imaging sensor. The optically multiplexed imaging systems described herein utilize one or more pixels in the imaging sensor to simultaneously observe a plurality of points in the object space. The devices and methods described herein generally involve dividing a pupil area of a single imager (e.g., a single image sensor and associated optical element or system to focus light onto the sensor) into a plurality of continuous sub-pupil regions that each define a channel representing an image of different fields of view or the same field of view from different perspectives. The pupil division can, in some embodiments, be accomplished by passing light through a multiplexing assembly positioned at or near to an entrance pupil or aperture stop of the imager that simultaneously optically multiplexes each channel onto the imager sensor. This is in contrast to methods that divide the overall transmission of the full pupil area using intensity beam splitters, dichroic beam splitters, polarization beam splitters, shutters, or other optical elements. It is also in contrast to other methods that divide the area of the pupil into a plurality of discontinuous regions that are spaced, separated, or interleaved, such as using an interleaved array of micro-prisms in which the total energy in one or more multiplexed channels is derived from a plurality of separated sub-pupil elements (e.g., a checkerboard in which all squares of a same color represent a single channel). The devices and methods described herein generally utilize mirrors or achromatic prisms, as opposed to single-element prisms, beam splitters, or other optical elements, to divide a pupil area into various portions that can be simultaneously captured by an imaging sensor. Further, steerable optical elements can be utilized to allow for breaking the relation of the imager's focal plane to the view created by the image. This means that various portions of an extended field of view—whether they are adjacent to one another, overlapping, or separated within the extended field of view—can be selected for imaging.

In one aspect, an imaging device is provided that includes an imager with a sensor and at least one optical element to focus light on the sensor, as well as a multiplexing assembly that divides a pupil area of the imager into a plurality of continuous sub-pupil regions that each define an image channel. The multiplexing assembly simultaneously directs light of a same spectrum from each of the image channels onto the imager such that light from each image channel forms an image on the sensor that fills a focal plane of the imager and the image overlaps with images formed by other image channels.

The imaging device described above can have a variety of modifications and/or additional features that are considered within the scope of the invention. For example, a number of different optical designs can be employed in the device. In some embodiments, the multiplexing assembly can be positioned at an entrance pupil or aperture stop of the imager, while in other embodiments the multiplexing assembly can be positioned proximate to an entrance pupil or aperture stop of the imager.

In certain embodiments, the device can further include at least one channel encoder that is optically coupled to the multiplexing assembly and encodes one of the plurality of channel images prior to detection by the sensor. Coding added to a channel image can be utilized to separate the particular channel image from a multiplexed image after detection by the sensor. A number of different techniques for encoding channel images can be employed. In some embodiments, for example, the at least one channel encoder can operate by any of (a) rotating the channel image by a specific amount, (b) shifting the channel image by a specific amount, (c) periodically attenuating light, and (d) encoding a point spread function by any of (1) imparting a unique optical phase or diffraction effect to light, (2) spatially dividing wavelength spectrum of light at the focal plane, and (3) spatially dividing a polarization state of light at the focal plane.

The imaging device can be used to capture in each of the plurality of image channels an image of a different portion of an extended field of view, or an image of a same portion of a field of view from different perspectives. In other words, the plurality of image channels can correspond to non-overlapping portions of a field of view in certain embodiments, and can correspond to overlapping portions of a field of view in other embodiments. In embodiments having image channels that correspond to overlapping portions of a field of view, the overlapping portions can be observed from different perspectives.

The multiplexing assembly itself can have a variety of different forms. In some embodiments, for example, the multiplexing assembly can include at least one reflective optical element. In other embodiments, the multiplexing assembly can include a monolithic reflector having a plurality of reflective facets that each correspond to one of the plurality of image channels (i.e., portions of an extended field of view being imaged). The monolithic reflector can optically combine light incident on each facet thereof to create the multiplexed image that is detected by the imager. In certain embodiments, the multiplexing assembly can further include a plurality of optical elements that reflect light from a portion of a field of view onto one of the plurality of reflective facets of the monolithic reflector. Further, in some embodiments each of the plurality of optical elements can be steerable to select the portion of the field of view that is reflected onto each facet of the monolithic reflector. This can allow the plurality of portions of the extended field of view being imaged to be selected from adjacent or separated positions within the extended field of view. Moreover, in embodiments that can produce stereo or three-dimensional (3D) images, each of the plurality of optical elements can be positioned a distance away from one another to create different perspectives when more than one optical element reflects light from overlapping portions of the field of view.

A monolithic reflector is not the only type of multiplexing assembly possible, however. In some embodiments, the multiplexing assembly can include a plurality of discrete optical elements. These discrete optical elements can be independently supported and independently steerable to direct light in any manner desired.

In certain embodiments, the plurality of discrete optical elements can include at least one refractive optical element. In some embodiments, the at least one refractive optical element can be achromatic. Exemplary refractive optical elements can include, for example, achromatic prisms, apochromatic prisms, and super-achromatic prisms.

The imaging devices described herein can be utilized in a variety of different settings and, as a result, can employ various image sensors. In some embodiments, for example, the sensor of the imager can be any of an infrared sensor, an ultraviolet light sensor, and a visible-light sensor.

In another aspect, a method for imaging a field of view is provided that includes dividing a pupil area of an imager into a plurality of continuous sub-pupil regions that each define an image channel, and simultaneously directing light of a same spectrum from each of the image channels onto a sensor of the imager such that light from each image channel forms an image on the sensor that fills a focal plane of the imager and the image overlaps with images formed by other image channels.

As with the imaging device described above, any of a variety of variations or additional steps are possible and considered within the scope of the present invention. For example, in some embodiments the method can further include disambiguating the multiplexed image detected by the sensor to create separate images for each of the plurality of image channels.

In certain embodiments, the method can further include coding at least one of the plurality of channel images. This can occur prior to detection by the sensor in certain embodiments. In some embodiments, coding at least one of the plurality of image channels can include any of (a) rotating the channel image by a specific amount, (b) shifting the channel image by a specific amount, (c) periodically attenuating light, and (d) encoding a point spread function by any of (1) imparting a unique optical phase or diffraction effect to light, (2) spatially dividing wavelength spectrum of light at the focal plane, and (3) spatially dividing a polarization state of light at the focal plane. In embodiments in which coding is utilized, the method can further include disambiguating the multiplexed image detected by the sensor based on the coding to create separate images for each of the plurality of image channels.

In certain embodiments, the method can further include positioning a plurality of optical elements such that each of the plurality of image channels is directed toward different portions of a field of view. In some embodiments, the different portions of the field of view are overlapping to some degree, while in other embodiments the different portions of the field of view do not overlap. In still other embodiments, the method can include positioning the plurality of optical elements such that each of the plurality of image channels is directed toward a same portion of a field of view.

Whether the portions of the field of view overlap entirely, or only to a partial degree, the plurality of optical elements can be positioned such that each of the plurality of image channels have a different perspective on the field of view from the other image channels. In some embodiments, the method can further include detecting a parallax between objects in the plurality of channel images to enable three-dimensional imaging.

In other embodiments, the method can further include passing light from the plurality of image channels through a multiplexing assembly positioned at an entrance pupil or aperture stop of the imager. Alternatively, the method can include passing light from the plurality of image channels through a multiplexing assembly positioned proximate to an entrance pupil or aperture stop of the imager.

As noted above, a number of different optical elements can be employed to multiplex light. Accordingly, in some embodiments the method can further include passing light from the plurality of image channels through at least one reflective optical element. In other embodiments, the method can include passing light from the plurality of image channels through at least one refractive optical element. And, in embodiments where at least one refractive optical element is employed, the at least one refractive optical element can be achromatic. Examples include achromatic prisms, apochromatic prisms, and super-achromatic prisms.

Many other variations and combinations of the aspects and embodiments described above are also possible and considered within the scope of the present disclosure. The various aspects, embodiments, and features of the invention described herein can be combined in many ways, and the listing provided above should not be considered exhaustive or limiting.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Certain exemplary embodiments will now be described to provide an overall understanding of the principles of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Figure 1A:
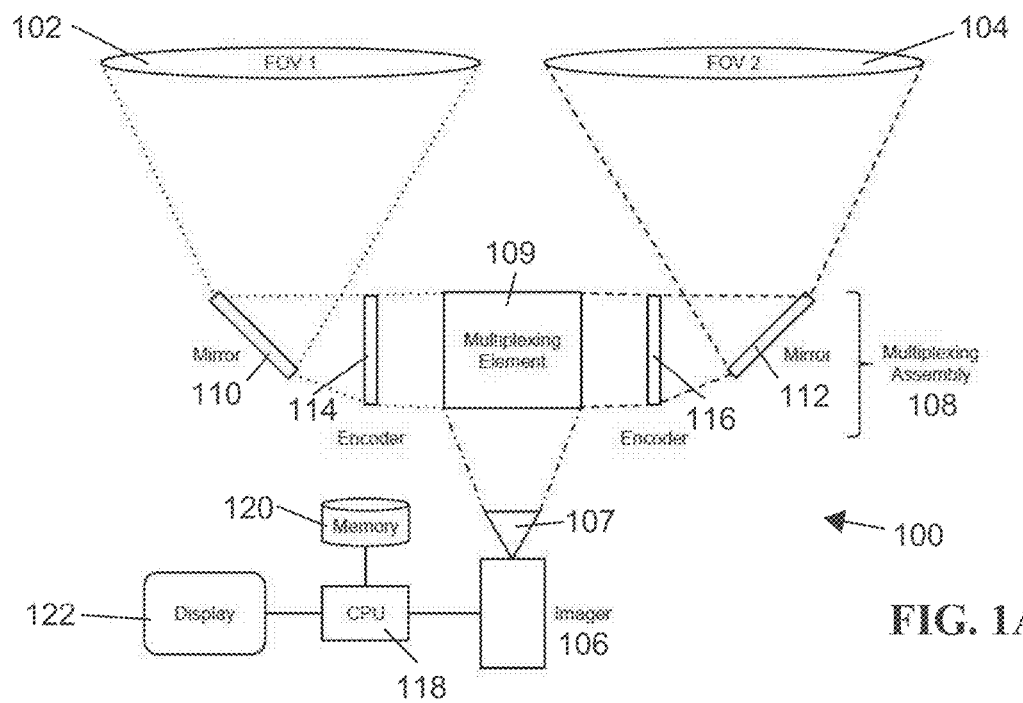
FIG. 1A is a schematic illustration of one embodiment of an imaging device according to the teachings of the present disclosure.
Figure 1B:
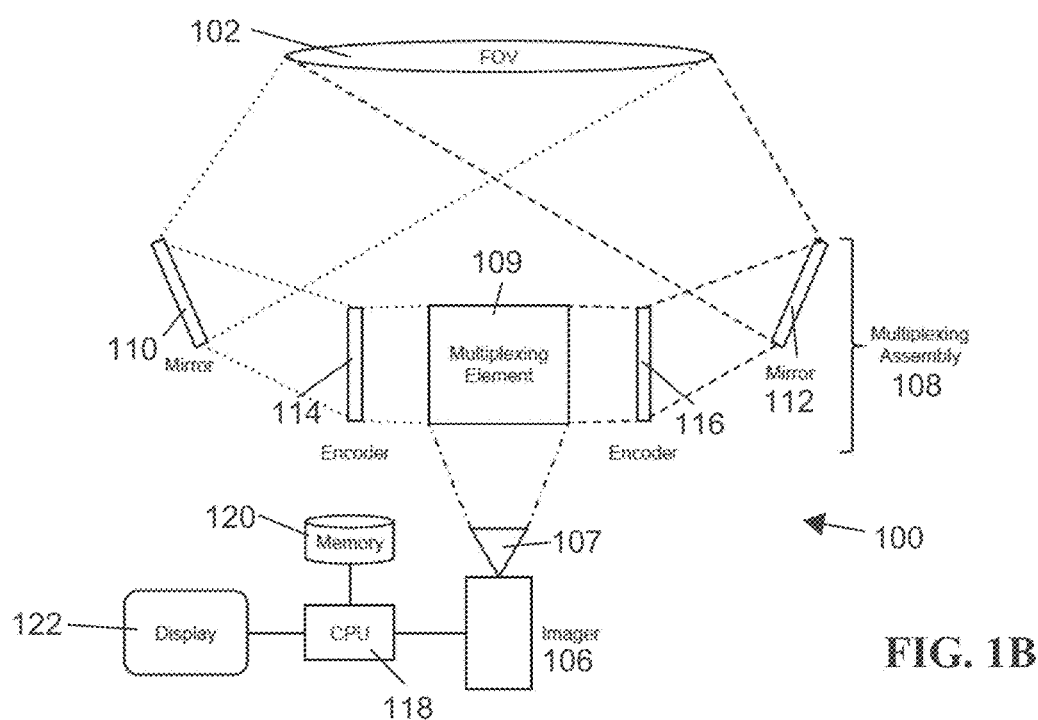
FIG. 1B is a schematic illustration of an alternative embodiment of the imaging device of FIG. 1A.

FIGS. 1A and 1B illustrate one embodiment of an imaging device 100 that multiplexes multiple channels of light for simultaneous collection by a single imager 106 that includes an image sensor and at least one optical element 107 to focus light on the sensor. The multiple channels of light can be directed to different portions 102, 104 of an extended field of view (as in FIG. 1A), or can be directed to the same portion of a field of view 102 from different perspectives (as in FIG. 1B). Of course, any combination of the two is possible as well, i.e., the portions 102, 104 of the extended field of view being imaged can be different, can be the same, or can overlap by any amount. Capturing different portions of an extended field of view can allow imaging of the extended field of view using only a single imager 106, while capturing overlapping portions of an extended field of view from different perspectives can allow stereo imaging or 3D imaging using the single imager 106. The multiplexing design of the imaging device 100 is realized through the use of a multiplexing assembly 108 placed at or near a pupil plane (e.g., an entrance pupil) or aperture stop of the imaging device 100. The use of a single imager 106 (i.e., a single imaging sensor) for all field of view channels ensures homogeneous image quality and proper registration between the channels. The multiplexing assembly 108 can have a variety of configurations, as described in detail herein, but in some embodiments can include a monolithic multi-faceted reflector 109 that can maximize the available pupil area for each field of view channel and can divide the pupil area into a number of continuous sub-pupil regions that are each directed to different regions of the wide field of view by reflection from different reflective facets of the monolithic reflector 109 and/or additional reflective elements, such as fold mirrors 110, 112. As is explained in more detail below, in other embodiments the multiplexing assembly can include an array of independently supported sub-aperture mirrors or achromatic refractive elements (e.g., achromatic prisms) rather than a single monolithic faceted reflector.

Placement of the multiplexing assembly 108 at or near a pupil plane of the imager 106 can minimize its volume (and therefore the size of the device 100) and provide the most uniform image plane irradiance for each imaged field of view 102, 104 (i.e., provide imaging with zero vignetting or other distortion). Ideal placement of the multiplexing assembly 108 can be achieved by incorporating one or more optical elements 107 into the imager 106 that provide an external entrance pupil or aperture stop at which the multiplexing mirror assembly can be positioned (as described in more detail below).

The imaging device 100 can also include optical or mechanical encoders 114, 116 that encode the channels of light being imaged prior to their detection by the imager 106. A number of different encoding techniques can be utilized, as explained in more detail below, including rotation of each field of view image, shifting of each field of view image, periodic amplitude attenuation of light from each channel, and through methods of imparting a unique code to each field of view image, for example through altering the point spread function, to uniquely encode each channel in a known manner. Point spread function alteration can be accomplished by imparting a phase shift, aberration, or diffraction effect to the entire intensity or to specific wavelengths or polarization states. Encoding can be accomplished with specific elements external to the multiplexing assembly, such as encoders 114 and 116, or by applying encoding features to surfaces in the multiplexing assembly 108 (e.g., surfaces of the monolithic reflector 109 or fold mirrors 110, 112), the one or more optical elements 107 of the imager 106, or any other supplemental optical elements included in the device. The coding added to each imaged portion 102, 104 of the extended field of view prior to capture by the imager 106 can be used to disambiguate the individual images of the portions 102, 104 of the extended field of view from the multiplexed image captured by the sensor of the imager 106. In some embodiments, disambiguation can be carried out using a digital data processor 118 coupled to the imager 106. The digital data processor 118 can be coupled to a digital data store 120 that can be used to archive captured images of the extended field of view. The multiplexed image captured by the imager 106, or the disambiguated images of the portions 102, 104 of the extended field of view, can be displayed to a user using a display 122 coupled to, or otherwise in communication with (e.g., wirelessly, etc.), the digital data processor 118.

Figure 2:
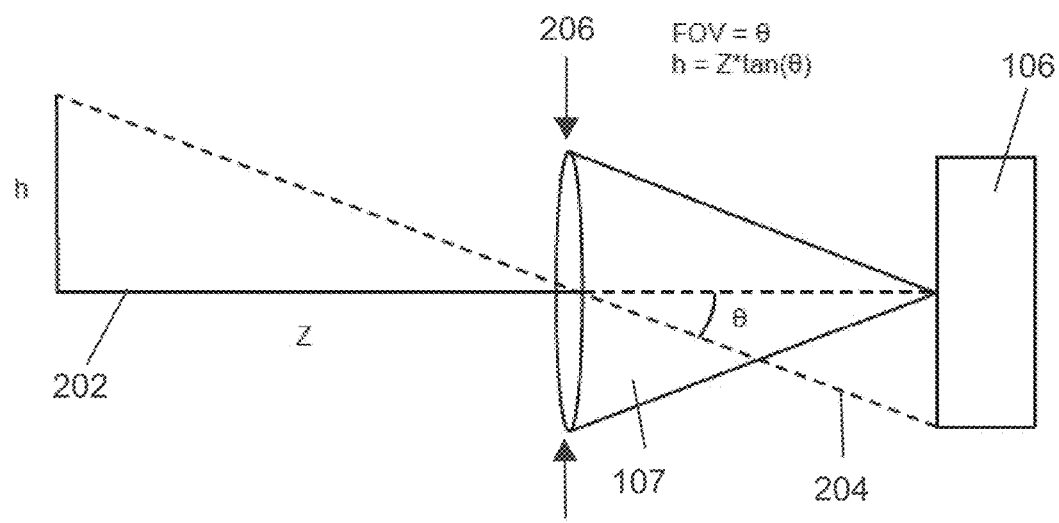
FIG. 2 is an illustration of mathematical relationships when dividing a pupil area of an optical system imaging a field of view.

There are a number of possible optical designs of the imaging device 100, but in general it can be desirable to place the multiplexing assembly 108 at, or near to, an entrance pupil, pupil plane, or aperture stop of the device. The entrance pupil is the image of an aperture stop as seen from a point on an optical axis 202 in front of a optical element or other lens system 107 used to focus light onto the sensor of the imager 106. FIG. 2 illustrates some basic mathematical relationships with regard to a chief ray 204 passing through the aperture stop 206 of the lens system 107 and intersecting a plane a distance Z along the optical axis 202 at a height h extending perpendicular to the optical axis when imaging an angular field of view $\theta$. The intersection height h represents the lateral offset of the center of the beam footprint from the optical axis 202 for a field of view angle $\theta$. In other words, for a multiplexing assembly located a distance Z from the pupil or aperture stop, the center of the beam footprint for each field of view angle $\theta$ intersects the multiplexing assembly at a height h. As the height h increases relative to the size of a pupil-dividing mirror or prism element in the multiplexing assembly, image irradiance non-uniformities increase due to non-uniform division of the pupil area with channel as a function of field of view angle $\theta$. In other words, channel-dependent vignetting occurs when the multiplexing assembly is located remotely with respect to a pupil plane or aperture stop. In order to minimize these image non-uniformities, the optical design can be selected such that Z is zero (e.g., by using a pupil relay as described below in connection with FIGS. 5A-5B) or by placing the multiplexing assembly 108 at the aperture stop (e.g., as described below in connection with FIGS. 4A-4B). If Z is a non-zero value, the field of view $\theta$ will generally have to be kept small to keep the value h small relative to the size of a pupil-dividing mirror or pupil element in the multiplexing assembly (e.g., as described below in connection with FIGS. 3A-3B). In some embodiments, the values of Z and $\theta$ are selected or controlled in combination according to the mathematical relationship in FIG. 2 to produce a known value of h for the purpose of producing a known image irradiance uniformity across a field of view of each channel of the multiplexed image. The value of h ranges between zero and an upper limit determined by the size of the beam footprint as a function of field of view angle and the geometry of the multiplexing assembly. When h is sufficiently large to prevent the intersection of the beam footprint for any angle within the field of view with any pupil-dividing element in the multiplexing assembly, the image irradiance falls to zero for those field of view angles in the respective multiplexed channels. Thus, the image is not considered multiplexed for those field of view angles in those channels because the pupil area is either directed entirely into different channels or extinguished. Those skilled in the art will understand that the acceptable ranges of values for h, Z, and θ will depend on the size of the pupil of the optical system 107, its aberrations, the geometry of the pupil-dividing multiplexing assembly, and the system-level requirements for image irradiance uniformity within the multiplexed channel images. Modifications and variations of these values are considered to be within the scope of this disclosure.

By way of further explanation, consider an exemplary system-level requirement that the relative image irradiance within a single channel may vary by no more than 50%. In other words, in a single de-multiplexed channel the ratio of the darkest point in the image to the brightest point in the image should be greater than or equal to 0.5. This sort of requirement may stem from a top-level requirement, such as camera sensitivity. Also consider a four-channel multiplexing assembly geometry (similar to assembly 108) that divides a circular pupil into 4 equal wedge-shaped quadrants that are oriented in rotation such that the centers of the quadrants fall at 45°, 135°, 225°, and 315° with respect to the pixel array in the sensor 106. Next consider an imaging lens system 107 and sensor 106 that together produce a square field of view of 20°×20° and a circular entrance pupil with a diameter of 10 mm. Together these parameters may be used to determine the maximum distance Z that the multiplexing assembly may be placed with respect to the entrance pupil or aperture stop of the lens. This calculation may be made analytically, or more easily using computer aided optical design software to compute the relative area of the imaging beam intersecting each quadrant of the multiplexing assembly as a function of field of view θ. The maximum field of view of this system is at the corners of the 20°×20° field of view, which is a half-angle θ 14.14° along the diagonal. In the described geometry the corners of the field of view will suffer the maximum image irradiance non-uniformity, which is used to determine the maximum distance Z. As Z increases, the intersection of the beam footprint shifts to a value h causing the beam footprint to fall predominantly on one quadrant of the multiplexing assembly while decreasing the beam area intersecting the opposing quadrant. This has the effect of producing a bright corner and a dark corner in the de-multiplexed image. Using optical design software, one can easily compute that, at the maximum field of view angle of 14.14°, a Z value of approximately 3.8 mm places 34% of the beam footprint area on one quadrant and only 17% on the opposing quadrant, giving a ratio of 0.5 in image irradiance. Thus, in this numerical example, the value for Z must be controlled to be less than 3.8 mm. In this example, the beam footprint was assumed to have a constant shape for all field of view angles, but in general it may change by an effect known as pupil aberration, which can be analyzed using known optical design software. Optical systems vary widely and have aperture sizes that range from less than a millimeter to many meters, and fields of view that range from less than 1 degree to beyond 180 degrees. Accordingly, a wide variation is possible in the values for Z, h, and θ in FIG. 2. Any variation of the parameters in this example will produce a different Z value and these variations are considered to be within the scope of this disclosure. Additionally, in this example the value of Z was constrained by other known parameters; however, Z could have also been constrained to limit a maximum field of view angle, pupil size, or multiplexing geometry to satisfy the image uniformity requirement.

As noted above, FIG. 3A illustrates one embodiment of an optical design for the imaging device 100 in which an aperture stop 302 of the lens system 107 is positioned between the multiplexing assembly 108 and the imager 106. In some embodiments, the multiplexing assembly 108 can include a plurality of mirror or achromatic prism elements that divide a pupil area into a number of continuous sub-pupil channels that are directed to the same or different positions in the observed scene. Light from an extended field of view (as shown by demonstrative light rays 301) is optically multiplexed by the mirror or achromatic prism elements in the multiplexing assembly 108 into the lens system 107. The lens system 107 (which can include the single lens shown at the aperture stop 302, or a series of lenses and/or mirrors as known in the art) can direct the light onto the sensor of the imager 106 (as shown by demonstrative light rays 303). In such an embodiment, the position of the multiplexing assembly 108 and field of view of the system can generally be sufficiently restricted to limit the displacement of the beam footprint at the multiplexing assembly, as noted above. As shown in FIG. 3B, displacement of the beam footprint projection at the multiplexing assembly 108 can cause multiplexing non-uniformities that can degrade the image illumination uniformity and resolution. Beam projection displacement is shown by the misaligned projection circles 304, 306, 308 in FIG. 3B. This displacement causes a variation in the pupil area multiplexed into each sub-pupil channel as a function of angle within the extended field of view that is carried from the multiplexing assembly 108 to the imager 106 via the rays 301 and 303.

Figure 4A:
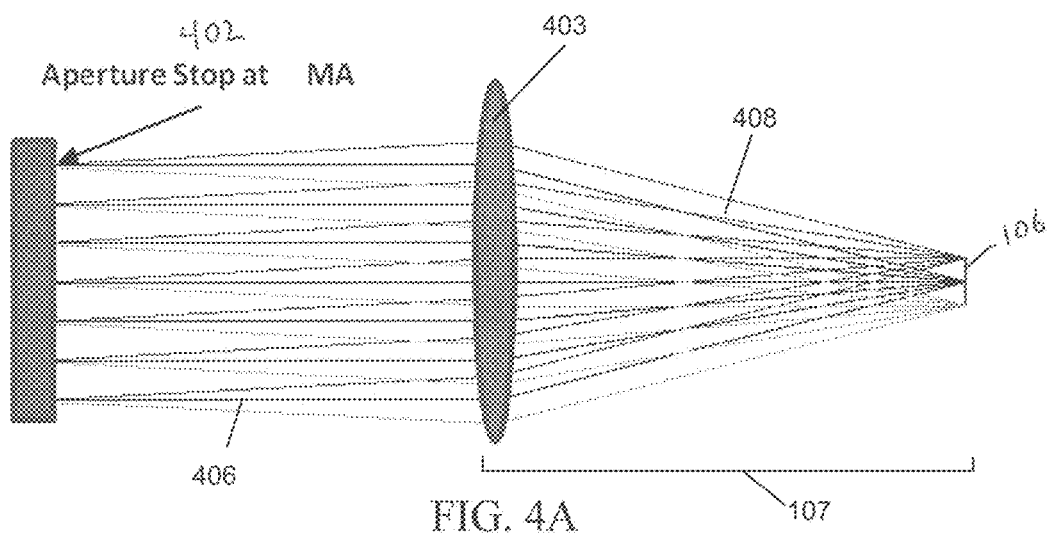
FIG. 4A is a schematic illustration of an alternative embodiment of an optical design for an imaging device, including placement of a multiplexing assembly at an aperture stop of the device.

FIG. 4A illustrates an alternative embodiment of an optical design for the imaging device 100 in which the multiplexing mirror assembly 108 is positioned at the aperture stop 402 of the lens system 107 in front of both lens 403 and imager 106. This arrangement, by definition, co-registers the beam footprints on the surface of the multiplexing assembly, as shown by the aligned projection circles 404 of FIG. 4B. As noted above, the multiplexing assembly 108 can optically multiplex any light incident thereon and direct it into the lens system 107 (as shown by demonstrative light rays 406). The lens system 107 can then direct the light to the sensor of the imager 106 (as shown by demonstrative light rays 408).

Figure 5A:
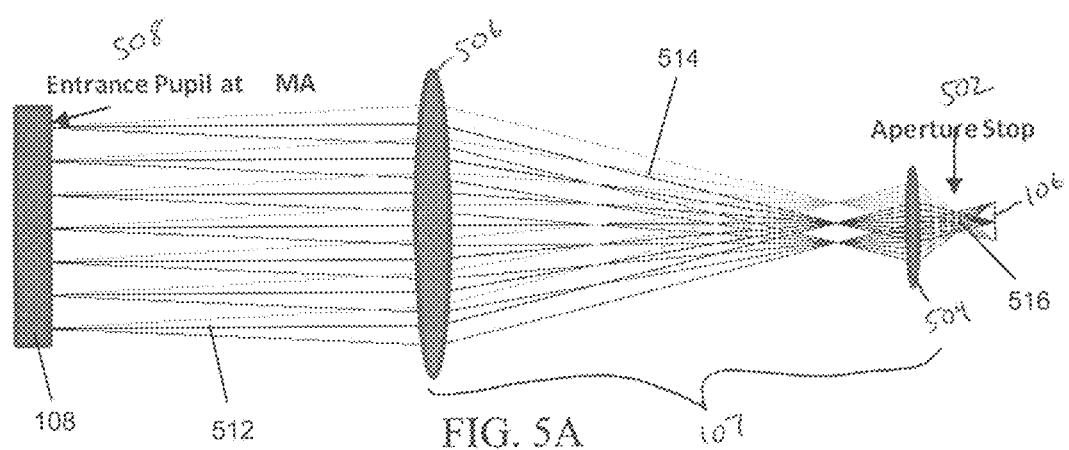
FIG. 5A is a schematic illustration of another embodiment of an optical design for an imaging device, including placement of a multiplexing assembly at an entrance pupil of the device.

FIG. 5A illustrates still another alternative embodiment of an optical design for the imaging device 100. In the design of FIG. 5A, the aperture stop 502 is positioned within the lens system 107 and lenses (or groups of lenses and/or mirrors) 504, 506 are used to create an entrance pupil 508 that is in front of the lens system 107. Such an arrangement can be referred to as a reimaging or pupil relay design, and the effect is to relay the image of the internal aperture stop 502 to the location of the entrance pupil 508 in front of the lens system 107. The multiplexing assembly 108 can be positioned at the entrance pupil 508, which causes the projection beam footprints to overlap for uniform multiplexing, as shown by the aligned projection circles 510 of FIG.

5B. As with the embodiments of FIGS. 3 and 4, the multiplexing assembly 108 can optically multiplex light incident thereon and reflect it onto the lens system 107 (as shown by demonstrative light rays 512). The lenses 502, 506, of the lens system 107 can direct the light onto the imager 106 (as shown by demonstrative light rays 514 and 516). In other embodiments, the multiplexing assembly may be placed near the entrance pupil in a similar arrangement.

Figure 3A:
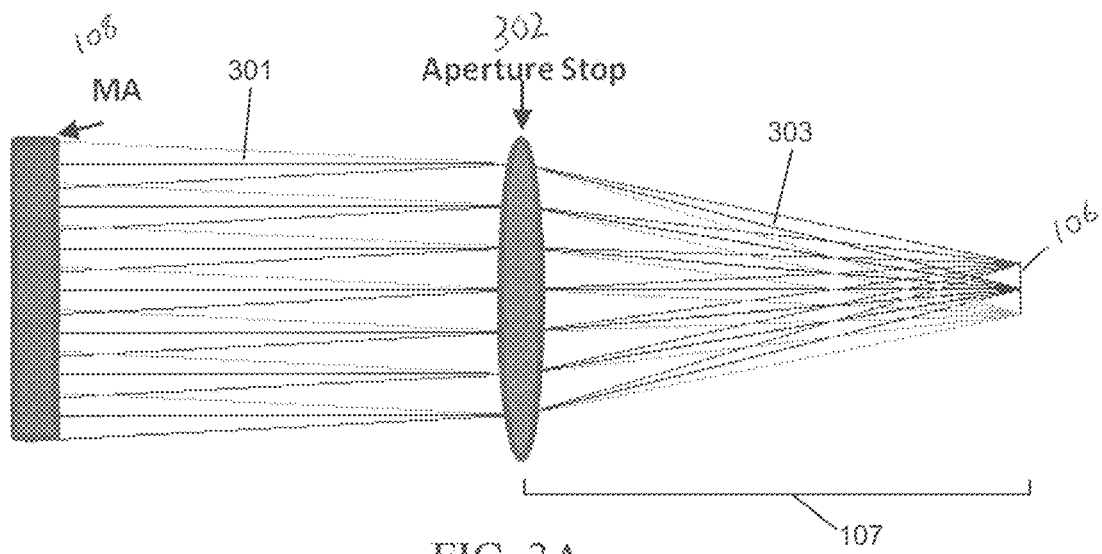
FIG. 3A is a schematic illustration of one embodiment of an optical design for an imaging device, including placement of a multiplexing assembly in front of an aperture stop of the device.
Figure 3B:
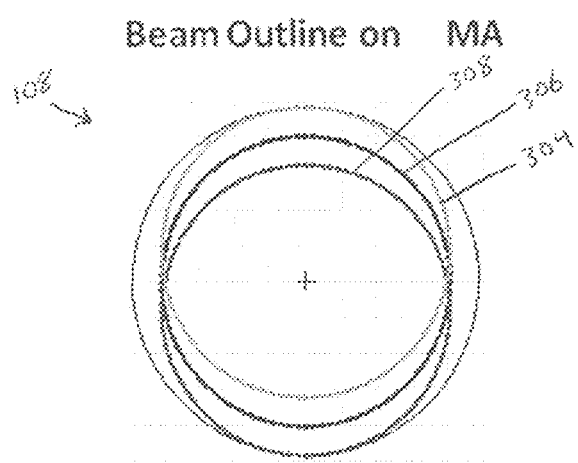
FIG. 3B is a cross-sectional illustration of the light incident on the multiplexing assembly of FIG. 3A.
Figure 4B:
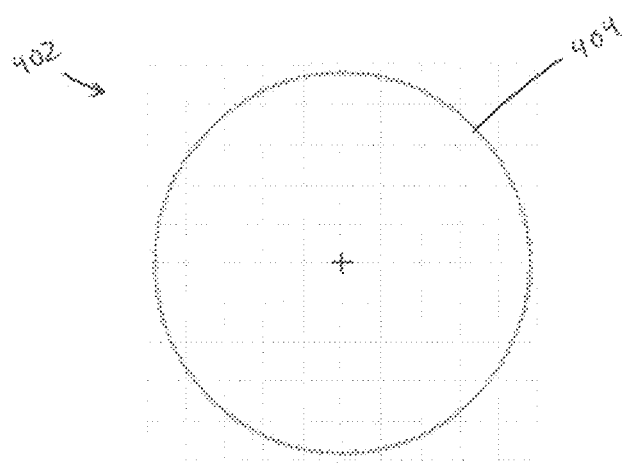
FIG. 4B is a cross-sectional illustration of the light incident on the multiplexing assembly of FIG. 4A.

Of course, the multiplexing assemblies depicted in FIGS. 3A, 4A, and 5A are merely a notional and exemplary representation. The scope of the present disclosure is considered to encompass multiplexing assemblies consisting of a monolithic faceted reflective element, a plurality of discrete reflective elements, and a plurality of discrete achromatic refractive elements (e.g., achromatic prisms) that may be tilted and/or shifted with respect to an optical axis of the lens system 107.

Figure 5B:
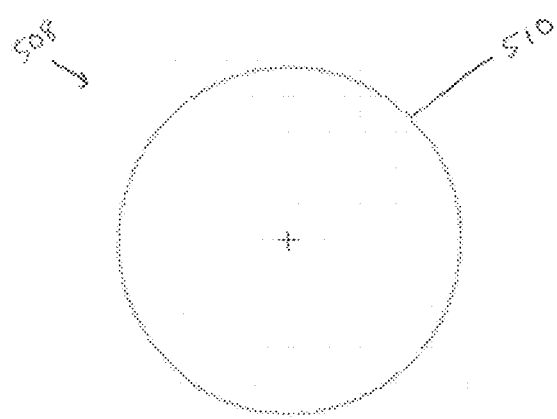
FIG. 5B is a cross-sectional illustration of the light incident on the multiplexing assembly of FIG. 5A.
Figure 6:
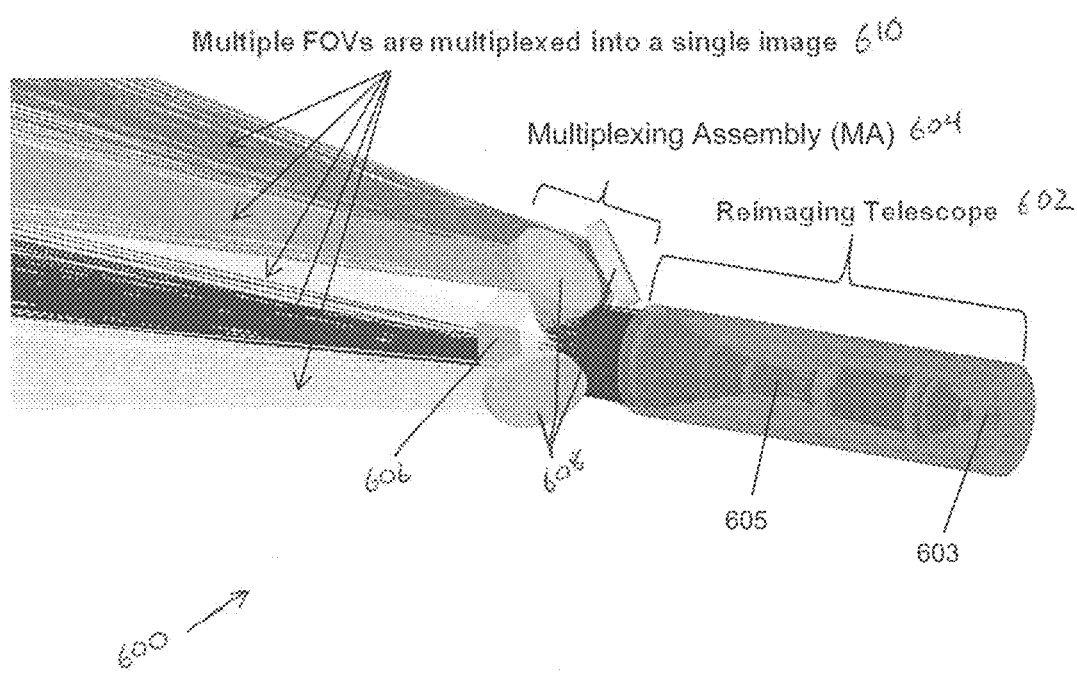
FIG. 6 is a perspective, partially transparent view of an alternative embodiment of an imaging device according to the teachings of the present disclosure.

FIG. 6 illustrates one embodiment of an imaging device 600 that utilizes the optical design of FIGS. 5A-5B. The device 600 includes a reimaging telescope 602 that includes an image sensor 603 and a lens system 605 configured to create an entrance pupil in front of the reimaging telescope. The device 600 further includes a multiplexing assembly 604 positioned at the entrance pupil in front of the telescope 602. Placing the multiplexing assembly 604 at this position (or proximate thereto) can help minimize the overall size of the device 600. The overall dimensions of the device can vary based on the size of its components and particular lens system 605, but in some embodiments the distances between the entrance pupil (shown by the position of the multiplexing assembly 604) and the imaging sensor 603 are designed by the considerations described above in connection with FIG. 2.

The multiplexing assembly 604 can include a monolithic reflector 606 having a plurality of reflective facets, as described in more detail below. A plurality of additional reflective elements 608 (e.g., fold mirrors) can be arranged around the monolithic reflector 606 so as to reflect light 610 from various different or overlapping portions of an extended field of view onto each of the facets of the monolithic reflector. The monolithic reflector 606 can be configured to optically multiplex light of a same spectrum incident on each facet thereof and direct the multiplexed image to the reimaging telescope 602. The lens system 605 of the reimaging telescope 602 then directs the multiplexed image to the imaging sensor 603, where it can be captured for later disambiguation or other analysis using, e.g., digital data processor 118. Note that the monolithic reflector 606 and lens system 605 are configured such that light from each facet (e.g., each image channel) forms an image on the sensor 603 that fills a focal or image plane of the sensor, meaning that the image formed by light in each image channel overlaps with images formed by light from other image channels.

Use of a monolithic reflector 606 with sharp transitions between the facets can be an energy efficient method for dividing a pupil area. In another embodiment, however, the facets can be replaced by individually supported discrete mirror elements or achromatic refractive elements, such as achromatic prisms. Such a variation is considered within the scope of the present disclosure, along with any other variations that accomplish the division of a pupil area into a plurality of continuous sub-pupil elements.

Figure 7:
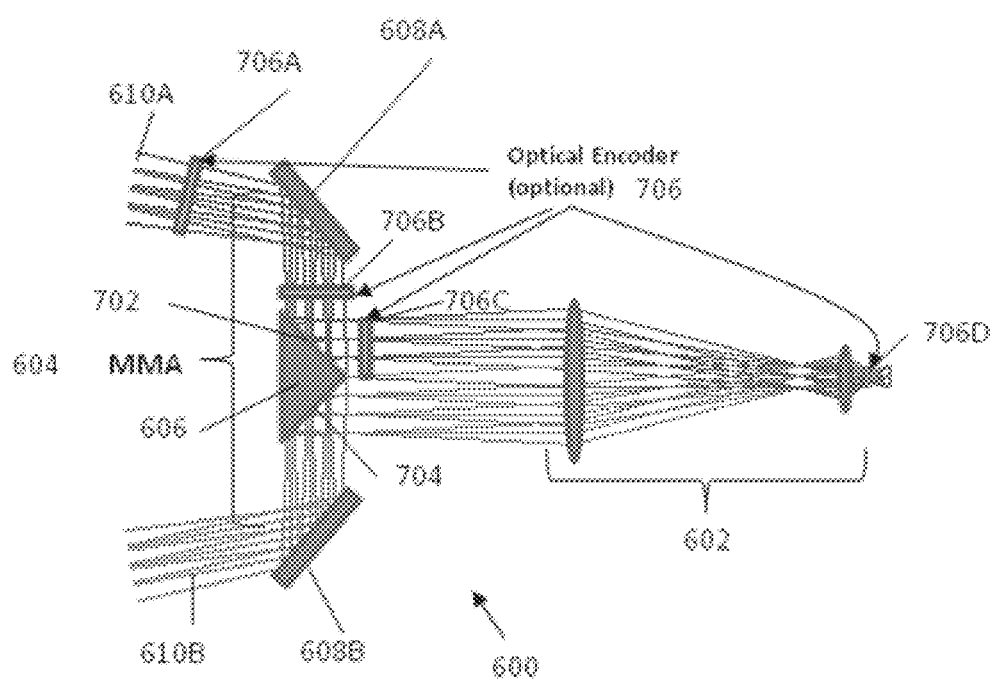
FIG. 7 is a schematic illustration of the imaging device of FIG. 6.

FIG. 7 illustrates a schematic view of the imaging device 600. As shown in the figure, light 610A from a first portion of an extended field of view (i.e., a first image channel) is reflected onto a first facet 702 of the monolithic reflector 606 via a first reflective element 608A and light 610B from a second portion of the extended field of view (i.e., a second image channel) is reflected onto a second facet 704 of the monolithic reflector via a second reflective element 608B. The monolithic reflector 606 optically multiplexes the light 610A and 610B (without filtering it based on color, etc.) and directs it to the reimaging telescope 602 such that light 610A and 610B both form images on an image sensor. The images formed by light 610A and 610B both fill a focal plane of the sensor and overlap one another. As is clear from FIG. 6, the device 600 can simultaneously multiplex light of a same spectrum from a plurality of portions of the extended field of view, i.e., any number of facets of the reflector 606, it need not be limited to the two portions illustrated in FIG. 7. In another embodiment, elements in the multiplexing assembly 604 may be arranged to direct the incoming light 610A, 610B from the same portion of the extended field of view or object point into the lens system 602. In such an embodiment, the imaging device 600 may be used to provide stereo imaging or 3D imaging because the particular portion of the extended field of view or object point is observed from different perspectives. The baseline separation dictating the parallax of near objects is dictated by the arrangement of the multiplexing assembly. In yet another embodiment, the multiplexing assembly 604 can be arranged to direct the incoming light 610A, 610B into the lens system 602 from a plurality of overlapping portions of an extended field of view wherein the registration difference between each channel of the multiplexed image is a known sub-pixel value. This allows each of the multiplexed channels to image the scene with a different known shift between the sampling array of the sensor and the object space. In such an embodiment, super-resolution techniques can be applied in the processer 118 to produce a super-resolved de-multiplexed image in which the effective instantaneous field of view (or angular sampling) of each pixel is decreased. These various embodiments can apply to any configuration of a multiplexing assembly, whether it is reflective or refractive in nature, monolithic or distributed, with any imaging lens prescription and proximity of the multiplexing assembly to the pupil or aperture stop, and arranged in any geometry with respect to the optical axis of the imaging lens 602. Such variations on the disclosed embodiments are considered to be within the scope of the invention.

Further, one or more beam-directing elements (e.g., reflective elements 606 and 608) can be utilized to direct light into the imaging lens 602. One or more of the elements can be steerable along one or more axes for any of the following purposes (a) to select the position of a portion of an extended field of view that is imaged, (b) to shift or rotate the image by a known angle, and (c) to affect the anamorphic geometric distortion caused by prism-based multiplexing elements. Given that each element 608 (or chain of elements) can be independently controlled, the portions of the extended field of view that are simultaneously multiplexed and imaged can be adjacent to one another, separated from one another, overlapping to any degree, or any combination thereof.

FIG. 7 also illustrates potential positions of an optical encoder 706 that can be used to encode a portion of the extended field of view being imaged prior to its capture by an image sensor. Optical encoding can be performed at any reflective or transmissive surface in the multiplexing assembly 702 or in the imaging lens 602, or by placing a transmissive or opaque member in a number of locations. For example, an optical encoder 706A can be positioned in front of the reflective element 608A, between the reflective element 608A and the monolithic reflector 606 (as shown by encoder 706B), or between the monolithic reflector 606 and the reimaging telescope 602 (as shown by encoder 706C). Further, in embodiments that utilize a pupil relay (including the embodiment illustrated in FIG. 7) or a design having an internal aperture stop, encoding can be applied at the location of the stop itself or at any intermediate pupil location (as shown by encoder 706D). It should be appreciated that any one of the illustrated encoders 706A, 706B, 706C, 706D can effectively encode a channel carrying light from a portion of the extended field of view before it is captured by an image sensor, and each of the illustrated encoders need not be used in combination with one another. Further, any of the encoders 706A-D can also be included at any of the disclosed locations relative to the light 610B from the second portion of the extended field of view. The inclusion of encoders is not necessary in all situations. As described in more detail below, in some embodiments disambiguation of a multiplexed image can be accomplished without any form of encoding.

Figure 8:
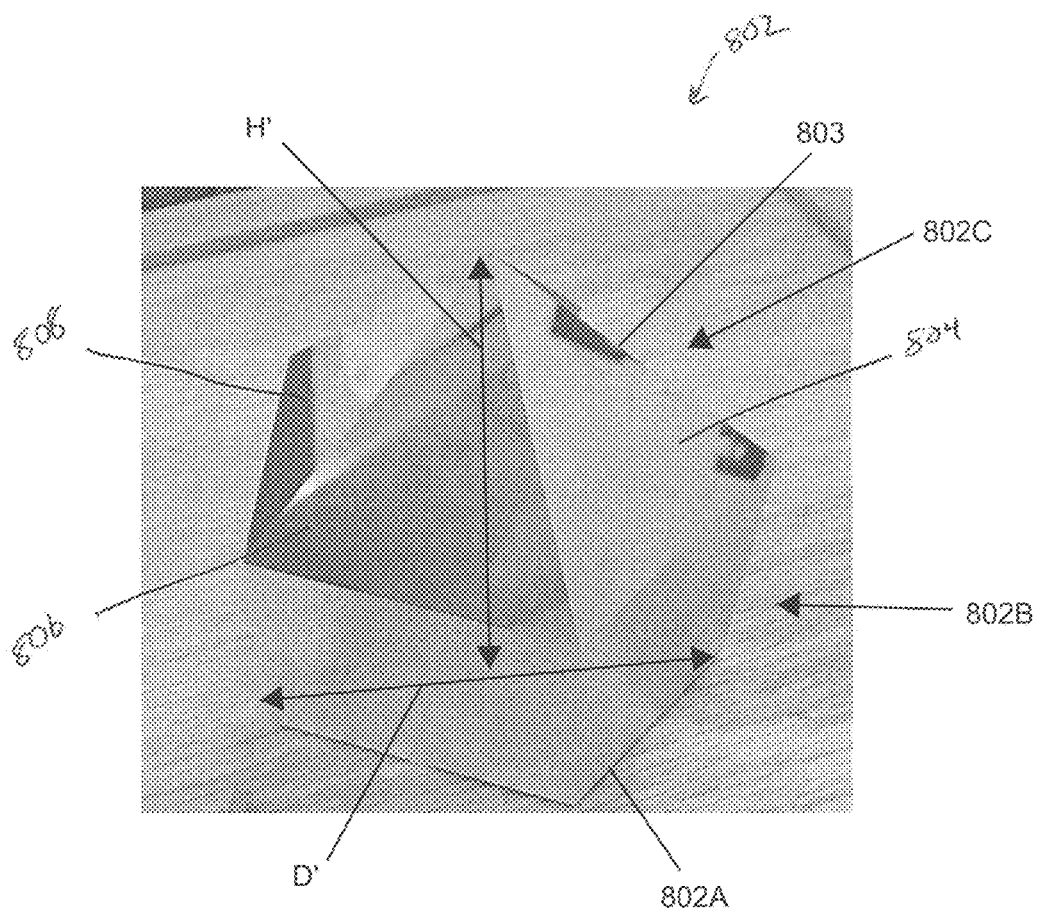
FIG. 8 is a perspective view of one embodiment of a multi-faceted monolithic structure for optically multiplexing multiple light channels.

FIG. 8 illustrates one embodiment of a monolithic reflector 802 in greater detail. As noted above, the reflector 802 can have a plurality of reflective facets 804, 806, 808 that can receive light from different portions of an extended field of view or from overlapping portions of the extended field of view observed from different perspectives. Each facet 804, 806, 808 of the monolithic reflector 802 can be matched to a beam-directing element (e.g., one of the reflective members 608) such that light from different portions of the extended field of view is directed onto each facet 804, 806, 808, thereby forming the plurality of light channels that are multiplexed. The monolithic reflector 802 can be shaped such that it simultaneously and optically multiplexes light of a same spectrum incident on any facet 804, 806, 808 thereof and directs the multiplexed light toward an image sensor (e.g., sensor of imager 106, reimaging telescope 602, etc.). The angle of each facet of the reflector defines the field of view that is multiplexed into the imaging lens. By the law of reflection, a mirror tilted at an angle φ with respect to an incident light ray deviates the ray by 2φ. Thus, the facet angles are selected according to the field of view of a single channel and the desired field of view coverage for the multiplexed imaging system. The angles of each facet, along with the geometry of any subsequent elements in the multiplexing assembly, may also be used to control the rotation of the multiplexed images with respect to the imaging sensor or scene geometry. While three facets 804, 806, 808 are visible in the figure, other facets are not visible and, in other embodiments, the number of facets can be varied based on, at least in part, the size of the system and the number of portions of the extended field of view to be multiplexed. In yet other embodiments, some facet areas may be cut away to allow light to bypass the multiplexing assembly entirely or to be directed by different elements of the multiplexing assembly, e.g., facet-shaped hole 803 passing through the reflector 802. The various beams of light incident on the facets of the monolithic reflector 802 can be immediately adjacent one another and need only be separated enough to avoid overlapping if additional channel-dependent elements are used in the multiplexing assembly. In practice, the monolithic reflector 802 often has 10 or fewer facets, as a higher number of facets can reduce the surface area of each facet available to receive light, thereby compromising image irradiance and resolution.

The monolithic reflector 802 can be formed from a variety of materials and can have a number of different shapes and sizes. As shown in the figure, in some embodiments the monolithic reflector 802 can have a base surface 802A, a projecting middle portion 802B, and a multi-faceted upper portion 802C. The reflector 802 can be positioned such that the upper portion 802C points toward the lens system 107, and light from the reflective elements 110, 112 can be directed to facets 804, 806, 808 of the upper portion. The shape of the reflector 802 can multiplex, or combine, the light incident on each facet 804, 806, 808 and reflect it toward the lens system 107 and imager 106. The shape of the monolithic reflector 802 and its facets 804, 806, 808 can be configured to maximize the available pupil area for each channel or portion of the extended field of view being imaged. In some embodiments, each facet of such a monolithic reflector 802 can have a surface area to capture 1/N of the pupil area of the imaging light where N is the number of multiplexed channels. The facet area is sized to accommodate 1/N of the pupil area of the imaging lens plus any shift of the beam footprint across the field of view caused by remotely locating the multiplexing assembly with respect to the pupil or aperture stop, or caused by tilting the individual facets with respect to the optical axis. The devices and methods of this disclosure can apply to many types of optical systems used for many applications, which means the surface area of each sub-pupil facet can range from a small fraction of a square millimeter for compact imaging systems (e.g., mobile device cameras) up to many square meters for large optical systems (e.g., ground-based telescopes). The interfaces between the facets 804, 806, 808 of the monolithic reflector 802 can be sharp (i.e., so-called knife-edge facets) such that a minimal amount of light is lost in the transition between adjacent facets. This geometry also has the benefit of minimizing thermal self-emission (i.e., background noise) from the monolithic reflector 802, which can make the reflector particularly suited for use with sensitive infrared image sensors. Additionally, the use of a monolithic pupil-dividing multiplexing element may simplify the mechanical mounting of the optic. Still further, the shape of the monolithic reflector 802 and its facets 804, 806, 808 can impart unique rotation, shift, or other modification to the image formed by each sub-pupil channel. This rotation, shift, or other modification can be utilized to encode the particular field of view (i.e., portion of the extended field of view) being reflected onto a particular facet of the reflector 802, as described in more detail below. In such an embodiment, separate optical encoders may not be necessary.

The monolithic reflector 802 (and, more generally, any mirror, achromatic prism, or other optical element in the multiplexing assembly) can be formed from a variety of different materials capable of reflecting light in the manner described above. In some embodiments, for example, the monolithic reflector 802 can be formed from metals such as aluminum, titanium, beryllium, stainless steel, invar (a nickel-iron alloy), and others, or it may be formed by engineered composite materials, polymer materials, low coefficient of thermal expansion glasses such as PYREX® (low thermal expansion borosilicate glass made by Corning Incorporated), ULE® (ultra low expansion glass made by Corning Incorporated), fused silica, or by other optical-graded glasses. In other embodiments it can be formed by any number infrared crystalline materials such as ZnS, ZnSe, Ge, Si, GaAs, CaF2, MgF2, or by various amorphous infrared materials such as ALON® (aluminum oxynitride made by Surmet Corporation), spinel (magnesium aluminum oxide), or chalcogenide glasses, or it may be formed by combinations of materials that may be plated or coated with thin films to enhance their ease of fabrication or reflective/transmissive properties. The monolithic reflector 802 can also have a variety of different sizes, depending on the size of the device, its lens system, and image sensor. In certain embodiments, the monolithic reflector 802 can have a height H' and diameter D' ranging from a fraction of a millimeter to several meters, depending on the lens system.

Figure 9:
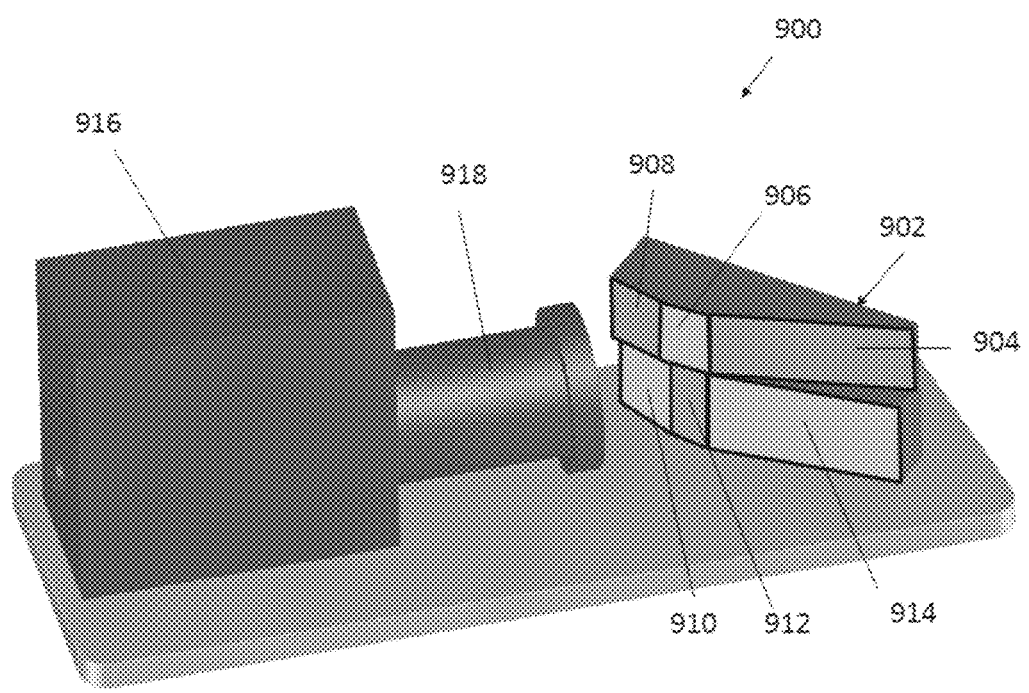
FIG. 9 is a perspective view of an another embodiment of an imaging device according to the teachings of the present disclosure.
Figure 10:
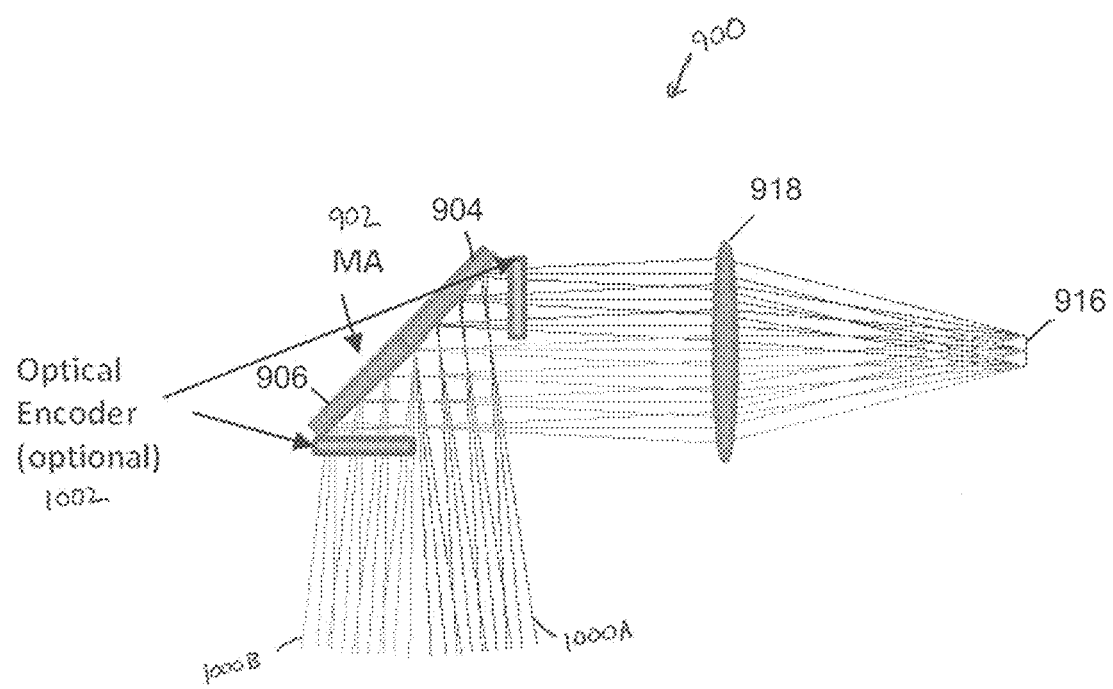
FIG. 10 is a schematic illustration of the imaging device of FIG. 9.

FIGS. 9 and 10 illustrate an alternative embodiment of an imaging device 900 that utilizes a different multiplexing assembly 902 to simultaneously multiplex light from various portions of an extended field of view, or light from the same portion of the field of view observed at different perspectives, into a single image captured by an image sensor within a camera 916. As shown in FIG. 9, the device 900 can include a lens assembly 918 that directs the multiplexed image from the multiplexing assembly 902 to the camera 916. In FIG. 9, the multiplexing assembly 902 is depicted as having a single reflective element for each channel and the multiplexing assembly may be monolithic or it can include a plurality of individually supported discrete optical elements. The single reflective element of the multiplexing assembly 902 includes a number of facets 904, 906, 908, 910, 912, 914 that each collect light from the extended field of view being imaged and define a different channel to be multiplexed by the multiplexing assembly. As mentioned above, the multiplexing assembly 902 can be configured to multiplex a same spectrum of light incident on each facet 904, 906, 908, 910, 912, 914 such that the images produced by the various channels fill a focal plane of the camera 916 and each channel image overlaps one another at the focal plane of the camera.

FIG. 10 illustrates the operation of the imaging device 900. Light 1000A from a first portion of an extended field of view is incident on a first facet 904 of the multiplexing assembly 902. Similarly, light 1000B from a second portion of the wide field of view is incident on a second facet 906 of the multiplexing assembly 902. The multiplexing assembly 902 is a single reflective element configured to simultaneously optically multiplex light of a same spectrum incident on its plurality of facets 904, 906 (and 908, 910, 912, and 914, as shown in FIG. 9, though the number of facets can vary in different embodiments) and direct that light to the lens assembly 918 and camera 916. Similar to the imaging device 600 described above, one or more optical encoders 1002 can be positioned before or after the multiplexing assembly 902 to encode light reflected from each of the facets of the multiplexing assembly. In some embodiments, for example, the optical encoders 1002 can be a transmissive or opaque member applied to the multiplexing assembly facet itself, or placed in close proximity thereto. In other embodiments, the aberrations of the imaging lens 906 are sufficient to provide unique encoding to the optical system. For example, spherical aberration, defocus, or other aberrations might be used to create a point spread function at the image sensor of the camera 916 that is different for each channel.

It should be appreciated that the multiplexing assembly 902 can be steerable along one or more axes to allow the selection of various portions of the extended field of view for imaging. However, the multiplexing assembly 902 has less freedom than the multiplexing assembly 604 because it is composed of a single reflective element with static relationships between its various facets. For example, in some embodiments each adjacent facet (e.g., facet 904 and 906) of the multiplexing assembly 902 can be angled such that they are exactly one field of view apart (e.g., 15° apart from one another in one embodiment). In such an embodiment, the general position of the multiplexing assembly 902 can be set, but the facet 904 will always image a portion of the extended field of view that is offset from the portion of the extended field of view imaged by the facet 906 by a set amount if the mirror assembly is monolithic. In an embodiment with independently supported discrete multiplexing elements, the field of view relationship between the channels may be variable. Still further, even with a monolithic multiplexing assembly, additional beam-directing elements, such as elements 608 discussed above, can be included to allow greater freedom in selecting the portions of the extended field of view that will be imaged on each channel.

Figure 11A:
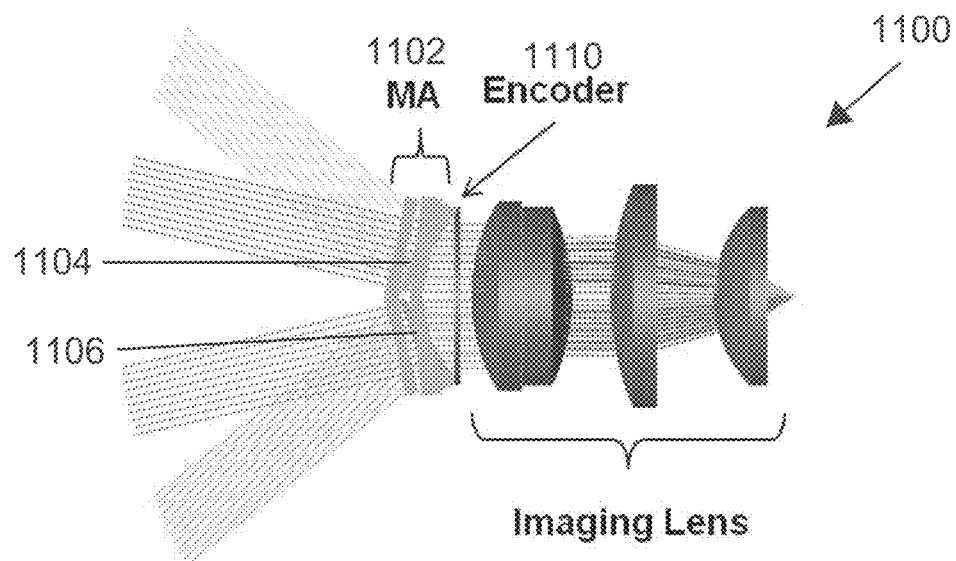
FIG. 11A is a top view of one embodiment of an imaging device according to the teachings of the present disclosure.
Figure 11B:
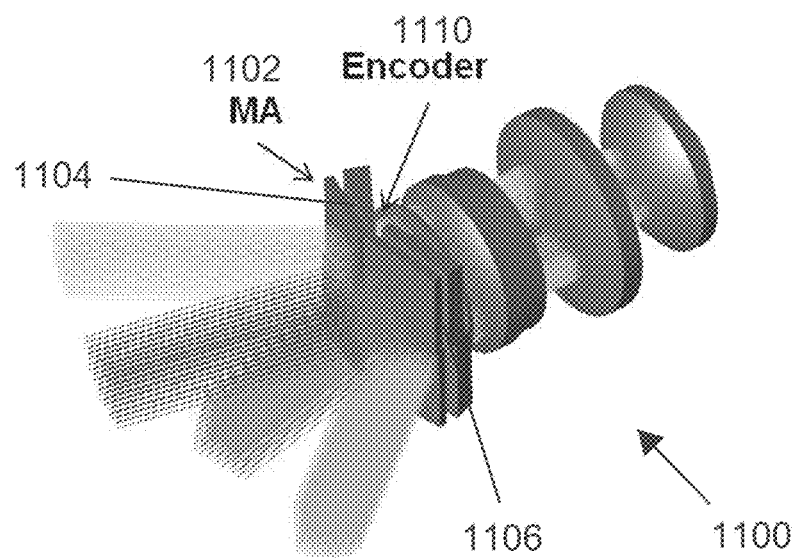
FIG. 11B is a perspective view of the imaging device of FIG. 11A.

In another embodiment illustrated in FIGS. 11A and 11B, an imaging device 1100 can include a multiplexing assembly 1102 that includes pupil-dividing achromatic prism elements 1104 and 1106. Each sub-pupil channel (that collects light from a particular portion of an extended field of view) can be multiplexed into the imaging lens 1108 using an achromatic prism pair. The wedge and tilt angles utilized, and materials of the individual prisms, can be selected to produce a known wavelength dispersion and geometric image distortion for light passing therethrough. Each of the two prism elements 1104, 1106 can be constructed from a different optical material such as glasses, optical polymers, and infrared crystals. The achromatic prism pair may include a low dispersion material sometimes referred to as a crown and a high dispersion material sometimes referred to as a flint. The low dispersion element can provide an excessive amount of beam deviation and the high dispersion element can provide a lesser amount of beam deviation in the opposite direction to impart negative dispersion into the wavelength spectrum. If the end result of this arrangement deviates two wavelengths at the same angle with a reduced amount of angular dispersion for the intervening wavelengths, the prism can be said to be achromatic. One skilled in the art will recognize that additional prisms or prisms with supplemental diffraction gratings (known as grisms) may be used to achieve this achromatic correction, or a condition where 3 or more wavelengths are deviated at the same angle, which is sometimes referred to as apochromatic or superachromatic. These variations are considered to fall within the definition of achromatic prisms as used herein. In the illustrated embodiment, two prism elements are used in the multiplexing assembly, though other embodiments can contain additional prisms and/or mirrors to further control the deviation, dispersion, distortion, and image rotation of the sub-pupil channels. Further, an encoder element 1110 can be placed between the multiplexing assembly 1102 and the imaging lens 1108 near the location of the aperture stop of the system. The encoder element 1110 can impart any form of phase shift or attenuation to the incoming channels, which can be used to identify the light from a particular channel during the disambiguation process, described in more detail below.

Figure 12:
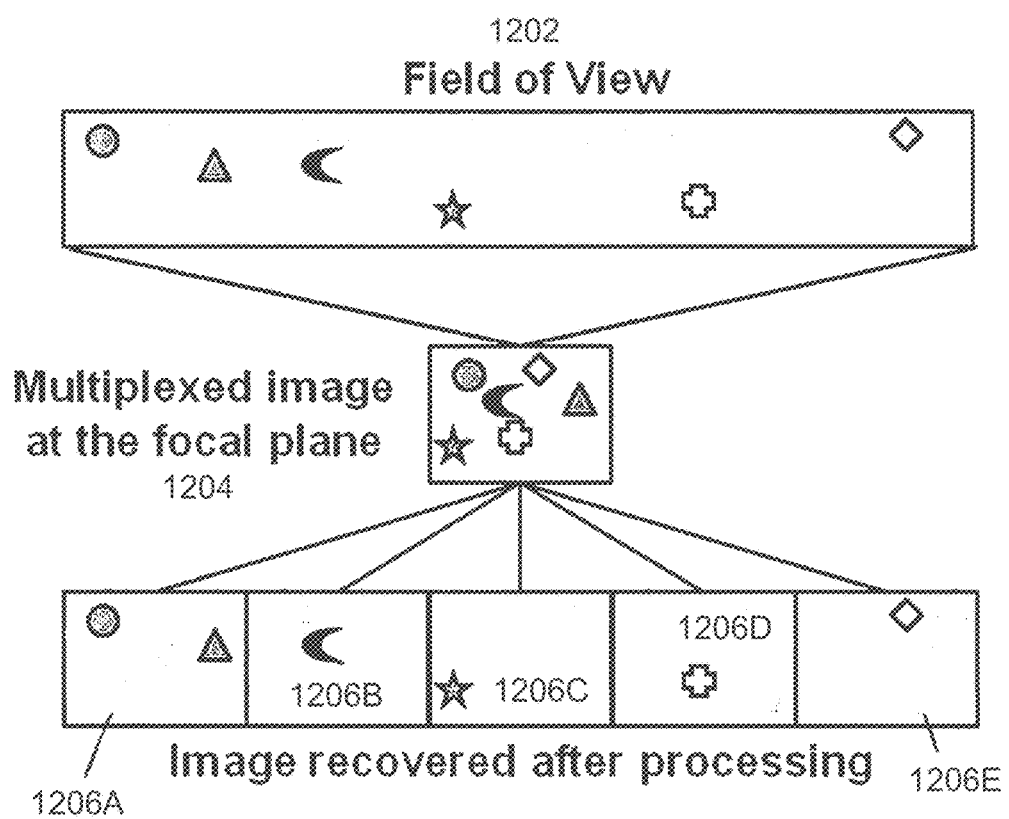
FIG. 12 is a schematic illustration of one embodiment of an encoding system for multiplexing and disambiguating multiple light channels.

Multiplexing images of a plurality of portions of an extended field of view in the manner described above produces a non-standard image at the image sensor (i.e., imager 106, camera 916, etc.). FIG. 12 illustrates a notional example of how an extended field of view 1102 might be expressed as a multiplexed image 1104 captured by an image sensor. The multiplexed image 1104 can have a size and aspect ratio that matches the resolution of the image sensor, even though the information contained in the image represents the extended field of view 1102 that has a much higher resolution and different aspect ratio.

The multiplexed image 1104 can be created optically using the multiplexing assemblies described above. Disambiguation of the multiplexed image into the plurality of de-multiplexed images 1106A-E, however, is typically accomplished computationally using a digital data processor coupled to the image sensor that captures the multiplexed image 1104. To separate the information contained in the multiplexed image 1104 into the various de-multiplexed images 1106A-E, information unique to, or encoded into, each portion of the field of view can be utilized.

As mentioned above, optical encoders 114, 116 can encode each channel multiplexed into the lens system in a unique manner such that the encoding can be utilized to disambiguate a multiplexed image. For example, the optical encoders 114, 116 can any of (a) rotate a channel image by a specific amount, (b) shift a channel image by a specific amount, (c) periodically attenuate light from each channel or a subset of channels, and (d) encode a point spread function by any of (1) imparting a unique optical phase or diffraction effect to the light from each channel, (2) spatially dividing a wavelength spectrum of light at the focal plane to form a wavelength encoded points spread function, and (3) spatially dividing a polarization state of light at the focal plane to form a polarization encoded points spread function. It should be noted that spatially dividing a wavelength spectrum of light at the focal plane accomplishes, in effect, a blurring of the image in a wavelength-dependent manner. This is distinct from certain efforts in the prior art to multiplex images using color differences. Such designs overlay images at different wavelengths, limiting the wavelength of each image. The devices and methods describes herein have an advantage over such designs in that a same spectrum of light (e.g., the full spectrum visible to the image sensor) can be captured in each image channel.

By way of further example, one method for disambiguating a multiplexed image can be referred to as Point Spread Function (PSF) engineering. In PSF engineering, each channel of the multiplexed image can be spatially encoded by unique spatial blurring or other alteration in a purposeful and unique manner. When viewing the multiplexed image 1104, any objects that exhibit the particular type of alteration used can be determined to come from a particular channel or portion of the extended field of view.

For example, the point spread function of channel 1206C may be encoded such that an object point from this channel appears as a horizontal line in the multiplexed image 1204. The other channels may have encoded point spread functions that produce lines at different orientations in the multiplexed image 1204. Thus, the star shaped object in the multiplexed image would appear horizontally streaked and other objects would appear streaked at different angles. The digital data processor would then interrogate the multiplexed image looking for objects streaked at different known orientations. The digital data processor would observe a horizontal streaking of the star shaped object in the multiplexed image 1204 and associate that with the known PSF of channel 1206C and place the star shaped object in the corresponding region of the recovered image. In this example the method of PSF encoding was a simple line, however any distribution of PSF intensity may be used for PSF encoding. For example, the PSF encoding can include a set of 2 or more points arranged uniquely in each channel or a more sophisticated distribution pattern. Further, the light intensity corresponding to each point in the encoded PSF may result from the full wavelength spectrum and polarization state of the light, or different points in the encoded PSF may correspond to different portions of the waveband or specific polarization states.

Another exemplary method for encoding and disambiguating a multiplexed image is to periodically attenuate the transmission of light from each channel, or from a subset of channels in the multiplexed image. This method, known as shuttering if 100% attenuation is used, can reveal which channel contains a certain object by comparing frames of the multiplexed image. Objects that partially or fully disappear when a first channel is attenuated and reappear when a second channel is attenuated can be determined to come from the first channel. Likewise, a subset of the plurality of channels may be simultaneously attenuated in a known manner to determine the object location from observing a known sequence of image modulation in a sequence of measured frames of the multiplexed image.

In still another exemplary method for encoding and disambiguating a multiplexed image, each channel or portion of an extended field of view being imaged can be rotated relative to the others. Observation of platform or scene movement in the image can then be used to reveal which image channel contains a particular object. For example, imagine a situation where there is relative motion between the imaging device and the scene that causes a known shift between captured images. This may occur by mounting the imaging system on a moving platform that observes a stationary scene such as an aircraft observing the ground, or it may occur in a stationary imaging system observing a moving scene such as a sensor observing vehicles passing on a highway, or it may occur by scanning the entire imaging system at a known angle across a fixed scene. Observation of the trajectory of different objects passing through the multiplexed image can be used to associate those objects with the correct channel. For example, if a known relative scene motion were to cause objects in non-rotated images to translate through the multiplexed from left to right, a 90 degree counter clockwise rotation of the image of channel 1206A would cause the objects in that channel to translate from bottom to top through the multiplexed image. Those objects could then be associated with channel 1206A by its known image rotation. Further, the scanning described above is not limited to uniform scanning of all channels simultaneously and cases of rotated channel images. The scanning described above can be applied to individual channels or to groups of channels by steering elements in the multiplexing assembly for the purpose of shifting objects in the steered channels by a known amount in the multiplexed image. Correlation between observations of the shifted objects in the multiplexed image and the known shift values may then be used to disambiguate the multiplexed image.

There are differences between the various types of encoding and disambiguation described above. For example, the PSF engineering method can capture all information about a scene in a single frame, whereas the field of view rotation, shifting, and attenuating methods can require comparing several different frames to piece together complete information. For this reason, PSF engineering can provide great advantages of speed, as disambiguation of the multiplexed image is limited only by the capabilities of the digital data processor analyzing the multiplexed image. However, devices using the channel rotation, shifting, or attenuation methods for disambiguation can still provide much faster sampling rates than traditional scanning mechanisms (e.g., a pan-tilt-zoom scanning mechanism that might scan a particular portion of a field of view once a minute rather than, e.g., once every couple frames), despite the need to observe multiple image frames for disambiguation.

In addition, encoding and disambiguation methods such as PSF engineering can be particularly suited for use with scenes that are in some way sparse (i.e., have low levels of objects and background information). This is because each frame of the multiplexed image contains all available information, so very information rich, dense scenes may be difficult to separate or parse into de-multiplexed images. Sparse scenes may be intrinsically sparse (e.g., a star-scape) or may be sparse in a given representation (e.g., a time-lapse sequence may be temporally sparse in that the scene does not change much over time, making changes easily identifiable).

As mentioned above, the optical encoders 114, 116 can be placed at any surface within the system that is in the path of light from each channel or portion of the field of view being imaged. The encoders can be physical, e.g., a transmissive or opaque member positioned in the beam path or on the reflective surface, or can be another form of mechanical or electrical interference with the transmission of light to the imaging sensor. For example, the encoders may be constructed by placing a known surface deformation on an optical surface that imparts a known aberration to the passing wavefront, thereby encoding the PSF. Likewise, a diffraction grating or hologram may be used to encode the point spread function. Or, a birefringenent or dichroic element may be used as an encoder to separate the polarization states or wavelength spectrum to produce a polarization- or wavelength-dependent PSF. Alternative methods of temporal encoding may be implemented that allow a known attenuation, image shift, or image rotation to be observed. For example, a moving element may place an attenuator in the path of a channel or pivot an optical surface to attenuate or shift a channel in the multiplexed image. Alternatively, rotation of each channel can be accomplished using the shape and design of the multiplexing assembly, or using additional elements in the multiplexing assembly disposed about a primary pupil-dividing element, such as the monolithic reflector 802 discussed above.

In certain embodiments, however, disambiguation of a multiplexed image can be accomplished without the need for encoding any of the image channels (i.e., encoding elements can be omitted entirely). In such embodiments, disambiguation can be accomplished based on known information about a scene. For example, when observing a star-scape for purposes of celestial navigation, information is known in advance about how the scene should look at a given date, time, location, etc. (e.g., relative positions of stars, groupings of stars, etc.). Accordingly, pattern-matching algorithms can be performed by the digital data processor 118 to match objects in the multiplexed image to their locations in individual image channels, thereby creating separate images for each channel.

As shown in FIG. 12, the devices and methods described herein can allow smaller, cheaper, and more efficient image sensors to effectively amplify their capabilities. For example, the multiplexed image 1104 can be created by a 25 megapixel imaging sensor but can include information for an extended field of view 5 times larger (i.e., each of images 1106A-E can be 25 megapixels). Further, the image sensor can capture this information at its native frame rate and the steerability of the elements of a multiplexing assembly can allow for the shape of the extended field of view being imaged to be selected at will. In other words, an imaging sensor having a 16×9 aspect ratio can be utilized to capture a panoramic scene, or several disparate and separated portions of an extended field of view, etc. Additionally, devices and methods described herein can allow for stereo or 3D imaging by capturing light from a different perspectives of an overlapping field of view in each channel. In such an embodiment, the resolution of each channel can match the full resolution of the image sensor, which stands in contrast to prior methods that direct images from different perspectives to non-overlapping regions of an image sensor, resulting in a lower resolution image and smaller field of view. Further, multiplexing in the devices and methods described herein is accomplished while transmitting the same spectrum of light for each image channel, in contrast to prior stereo imaging designs that overlay images from different perspectives at different wavelengths (e.g., using color filters, etc.).

The devices and methods described herein provide for high resolution and low distortion imaging of an extended field of view by using multiplexing optical elements to divide a pupil area of a single imaging lens into a plurality of continuous sub-pupil portions that can be simultaneously multiplexed together and captured by a single image sensor. As a result, the devices and methods described herein can provide increased resolution, lower distortion, lower cost, smaller footprint, and superior multiplexing (e.g., using continuously sampled fields of view) over prior designs. A specific advantage of this type of system is that the field of view of the multiplexed image can exceed the field of view provided by the optical design of the imager lens. This particularly relates to imaging aberrations that scale with field of view angle, notably distortion in wide field of view lenses. Such devices and methods can be particularly suited to use in observing low background sparse scenes such as those encountered in observational astronomy, space surveillance, and star tracking for attitude control. Increased performance can also be achieved when viewing higher background sparse scenes, however. Moreover, using multiple frame disambiguation techniques (e.g., the channel attenuation or rotation methods of encoding described above) can improve performance even with scenes that are densely populated with information, such as those imaged in typical photographic and surveillance applications. The multiplexing architecture described herein can be a lower cost, size, weight, and power alternative to conventional imaging arrays or scanning systems. This can make the devices and methods described herein suitable for use in a variety of imaging, surveillance, and tracking applications, including, for example, digital/optical communications, gaming, virtual reality, etc.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. An imaging device, comprising:
   an imager including a sensor and at least one optical element to focus light on the sensor;
   a multiplexing assembly that divides a pupil area of the imager into a plurality of continuous sub-pupil regions that each direct collected light to form an image on the focal plane of the imager that fills the focal plane of the imager and defines an image channel;
   wherein the light from each image channel is of a same spectrum and the multiplexing assembly simultaneously directs the light from each image channel onto the focal plane of the imager such that the image channels overlap on the focal plane of the imager and each pixel on the focal plane simultaneously views multiple object points or the same object point from multiple perspectives.

2. The imaging device of claim 1, wherein the multiplexing assembly is positioned at or proximate to an entrance pupil or aperture stop of the imager.

3. The imaging device of claim 1, further comprising at least one channel encoder that is optically coupled to the multiplexing assembly and encodes one of the plurality of channel images prior to detection by the sensor.

4. The imaging device of claim 3, wherein the at least one channel encoder operates by any of (a) rotating the channel image by a specific amount, (b) shifting the channel image by a specific amount, (c) periodically attenuating light, and (d) encoding a point spread function by any of (1) imparting a unique optical phase or diffraction effect to light, (2) spatially dividing a wavelength spectrum of light at the focal plane, and (3) spatially dividing a polarization state of light at the focal plane.

5. The imaging device of claim 1, wherein the plurality of image channels correspond to non-overlapping portions of a field of view.

6. The imaging device of claim 1, wherein the plurality of image channels correspond to overlapping portions of a field of view.

7. The imaging device of claim 6, wherein the overlapping portions of the field of view are observed from different perspectives.

8. The imaging device of claim 1, wherein the multiplexing assembly includes at least one reflective optical element.

9. The imaging device of claim 1, wherein the multiplexing assembly includes a monolithic reflector having a plurality of reflective facets that each correspond to one of the plurality of image channels.

10. The imaging device of claim 9, further comprising a plurality of optical elements that reflect light from a portion of a field of view onto one of the plurality of reflective facets of the monolithic reflector.

11. The imaging device of claim 10, wherein each of the plurality of optical elements is steerable to select the portion of the field of view.

12. The imaging device of claim 11, wherein each of the plurality of optical elements is positioned a distance away from one another to create different perspectives when more than one optical element reflects light from overlapping portions of the field of view.

13. The imaging device of claim 1, wherein the multiplexing assembly includes a plurality of discrete optical elements.

14. The imaging device of claim 1, wherein the multiplexing assembly includes at least one refractive optical element.

15. The imaging device of claim 14, wherein the at least one refractive optical element includes an achromatic prism.

16. The imaging device of claim 1, wherein the sensor is any of an infrared sensor, an ultraviolet light sensor, and a visible-light sensor.

17. A method for imaging a field of view, comprising:
dividing a pupil area of an imager into a plurality of continuous sub-pupil regions that each direct collected light to form an image on a focal plane of the imager that fills the focal plane of the imager and defines an image channel; and
simultaneously directing light from each image channel onto the focal plane of the imager such that the image channels overlap on the focal plane of the imager and each pixel on the focal plane simultaneously views multiple object points or the same object point from multiple perspectives;
wherein the light from each image channel is of a same spectrum.

18. The method of claim 17, further comprising disambiguating the image detected by the sensor to create separate images for each of the plurality of image channels.

19. The method of claim 17, further comprising coding at least one of the plurality of channel images.

20. The method of claim 19, wherein coding at least one of the plurality of channel images includes any of (a) rotating the channel image by a specific amount, (b) shifting the channel image by a specific amount, (c) periodically attenuating light, and (d) encoding a point spread function by any of (1) imparting a unique optical phase or diffraction effect to light, (2) spatially dividing a wavelength spectrum of light at the focal plane, and (3) spatially dividing a polarization state of light at the focal plane.

21. The method of claim 19, further comprising disambiguating the image detected by the sensor based on the coding to create separate images for each of the plurality of image channels.

22. The method of claim 17, further comprising positioning a plurality of optical elements such that each of the plurality of image channels is directed toward different portions of a field of view.

23. The method of claim 17, wherein the different portions of the field of view are overlapping.

24. The method of claim 23, wherein each of the plurality of image channels has a different perspective on the field of view from other image channels.

25. The method of claim 24, further comprising detecting a parallax between objects in the plurality of channel images to enable three-dimensional imaging.

26. The method of claim 17, wherein the different portions of the field of view do not overlap.

27. The method of claim 17, further comprising passing light from the plurality of image channels through a multiplexing assembly positioned at or proximate to an entrance pupil or aperture stop of the imager.

28. The method of claim 17, further comprising passing light from the plurality of image channels through at least one reflective optical element.

29. The method of claim 17, further comprising passing light from the plurality of image channels through at least one refractive optical element.

30. The method of claim 29, wherein the at least one refractive optical element is achromatic.

* * * * *